E. C. SHAW.
VEHICLE WHEEL RIM.
APPLICATION FILED MAY 2, 1910.
1,178,541.
Patented Apr. 11, 1916.
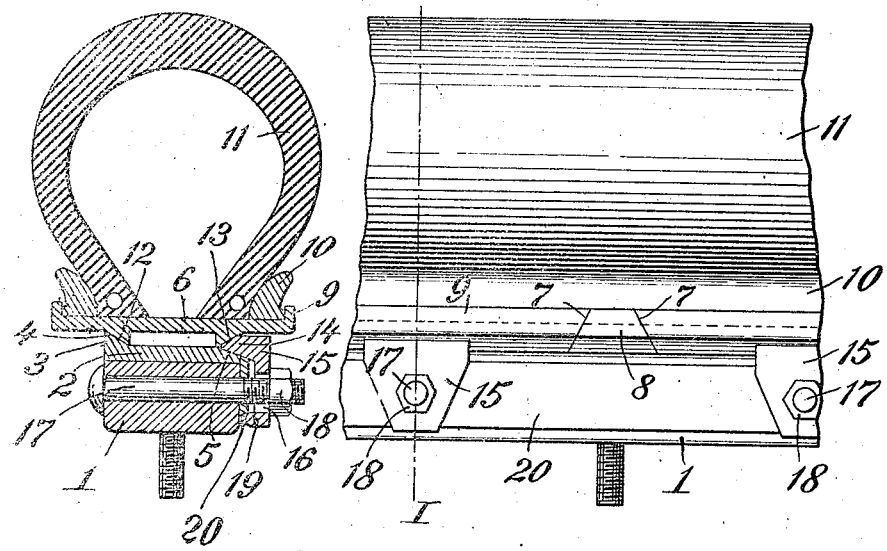

UNITED STATES PATENT OFFICE.

EDWIN C. SHAW, OF AKRON, OHIO, ASSIGNOR, BY MESNE ASSIGNMENTS, TO THE B. F. GOODRICH COMPANY, A CORPORATION OF NEW YORK.

VEHICLE-WHEEL RIM.

1,178,541.   Specification of Letters Patent.   Patented Apr. 11, 1916.

Continuation in part of application Serial No. 375,715, filed May 25, 1907. This application filed May 2, 1910. Serial No. 598,972.

*To all whom it may concern:*

Be it known that I, EDWIN C. SHAW, a citizen of the United States, residing in Akron, county of Summit, and State of Ohio, have invented certain new and useful Improvements in Vehicle-Wheel Rims, of which the following is a specification.

This invention relates to vehicle wheel rims of the type designed primarily for carrying pneumatic or other resilient tires in which a portion of the rim carrying the tire can be removed from the wheel and a new tire and rim portion substituted. Rims of this type are commonly known as demountable rims.

The present application, as to certain of the broad subject-matter, is a continuation of my application Serial Number 375,715, filed May 25th, 1907.

In the accompanying drawings, which form a part of this specification, Figure 1 is a section through a wheel felly, rim and tire illustrating one embodiment of my invention, the section being taken on line I—I of Fig. 2; Fig. 2 is a side elevation of a portion of the wheel felly, rim and tire shown in Fig. 1; Fig. 3 is a section similar to Fig. 1, showing a modified form of my invention.

Referring to the drawings in detail, the numeral 1 designates the wheel felly, to which is permanently secured the band or fixed rim member 2, which is provided at one side with a flange 3 having an inclined upper face 4, and at the other side with a downwardly inclined or tapered face 5. The detachable rim member or rim proper 6 in the embodiment of the invention shown in Figs. 1 and 2, is split at 7, the wedge-piece 8 which is cut from it being used to lock its ends in position. It is provided with flanges 9 which serve to retain the endless tire retaining flanges 10, against which seat the beads of the tire 11. The rim 6 is provided with a number of inwardly inclined surfaces 12 and 13, one of which engages with the inclined face 4 on the band 2, while the other is engaged by the upper inclined face of the wedge portion 14 projecting from the keeper 15. The keeper 15 is provided at 16 with a perforation through which projects the threaded end of a bolt 17 carried by the felly. The nut 18 screwed on this bolt retains the keeper in position and causes it to directly promote the wedging engagement between the fixed and removable rims. The opening 16 in the keeper is made preferably of somewhat greater diameter than the bolt in order to permit the wedge 14 to ride up upon the inclined face 5 of the fixed rim portion and seat itself evenly between the fixed and removable rims. The keepers are preferably provided at their lower ends with projections 19 which act in the nature of fulcrums, these projections bearing against the ring of metal 20 which is preferably secured to the side of the felly. Any desired number of the keepers may be used and they may be made in sections of such length as may be found necessary. By forming the keepers with wedge-shaped portions having both upper and lower surfaces inclined engaging with similarly inclined surfaces on the removable and fixed rims, respectively, a more uniform seating of the wedges is obtained than if the wedges were formed with a lower face whose elements were parallel with the axis of the wheel. I find this a point of great importance as the weights to be sustained by the rim are of such magnitude and the stresses to be encountered so violent that unless a very even seating of all the parts is obtained, resulting in the engagement of surfaces of considerable area, a disastrous grinding and wearing action is inevitable.

In Fig. 3 I have shown a modified embodiment of my invention in which my improved devices for securing a removable rim upon a fixed rim are shown as applied to a removable rim of a different type than that shown in Fig. 1. The removable rim of this figure is shown as a wellknown form of what is commonly referred to in the trade as a "quick-detachable" rim, that is, one in which one of the tire flanges is made removable. The rim shown comprises an endless band or tire seating portion 30 having an upturned flange 31 at one side thereof against which seats an endless tire retaining flange 32. The other side of the tire seating portion is bent downwardly and upwardly to form a channel 33 in which seats a split locking ring 34, which serves to retain a second endless tire retaining flange 35. The band 30 has secured to it a member 36 provided with inclined faces 37 and 38, the former of which engages the inclined face 4 on the band 2. A keeper 39 similar to the keeper 15 shown in Fig. 1 is provided with a wedge portion 40 which has upper and lower inclined faces engaging, respectively, with the face 38 of the member 36 and the face 5 of the band 2. The construction and operation of the keeper 39 are similar in all respects to those of the keeper 15, except that the keeper 39 is beveled at 41 to permit the same to be inserted beneath the channel 33 formed at the side of the band 30. By reason of the face 5 of the band 2 with which the wedge portion of the keeper engages being downwardly inclined, it is possible to insert the wedge between this surface and the inclined surface on the tire carrying portion of the rim without interference by the channeled portion 33.

Having thus described certain preferred embodiments of my invention, but without limiting myself to the details thereof as specifically shown and described, I claim:

1. A locking member for securing detachable rims to wheels, comprising a body portion and a wedge-shaped portion projecting therefrom, the wedging surfaces of the latter being oppositely inclined to the plane of the body portion, the body portion being perforated and carrying a fulcruming projection, the wedge portion and fulcruming projection projecting from the same face of the body portion, but being located upon opposite sides of the perforation.

2. A locking member for securing detachable rims to wheels, comprising a perforated body portion having projecting from one face thereof and upon opposite sides of the perforation a wedge portion and a fulcruming projection.

3. In a vehicle wheel, in combination, a fixed wheel member having seats at each side thereof, at least one of said seats being beveled, a detachable tire-carrying rim seated on said member having a seat engaging the seat at one side of said fixed wheel member, and having a beveled seat facing the beveled seat on the fixed wheel member, but oppositely inclined thereto, and a keeper directly promoting the wedging engagement between said wheel member and rim, said keeper comprising a body portion and a wedge-shaped portion projecting therefrom, the wedging surfaces of the latter being oppositely inclined to the plane of the body portion, the body portion being perforated and carrying a fulcruming projection, the wedge portion and fulcruming projection projecting from the same face of the body portion, but being located upon opposite sides of the perforation, and a straight bolt for securing said keeper to said fixed wheel member, said bolt passing transversely through said fixed wheel member in a line substantially parallel with the axis of the wheel, the end of said bolt passing freely through the perforation in the body of the keeper, and a nut screwing on the outer end of said bolt and engaging the outer surface of said keeper.

EDWIN C. SHAW.

Witnesses:
WALTER K. MEANS,
MARCUS H. HILL.